No. 622,307. Patented Apr. 4, 1899.
P. J. WILSON.
LOCK NUT.
(Application filed June 22, 1898.)

(No Model.)

Witnesses.
Thomas L. Walpden.
Harry Jackson.

Peter Joseph Wilson Inventor

UNITED STATES PATENT OFFICE.

PETER JOSEPH WILSON, OF SHEFFIELD, ENGLAND.

LOCK-NUT.

SPECIFICATION forming part of Letters Patent No. 622,307, dated April 4, 1899.

Application filed June 22, 1898. Serial No. 684,183. (No model.)

*To all whom it may concern:*

Be it known that I, PETER JOSEPH WILSON, a citizen of Great Britain, residing at Sheffield, in the county of York, England, have invented a new and useful appliance in the form of a Lock-Nut, (for which I have obtained provisional protection in Great Britain, No. 8,389, bearing date April 9, 1898;) and I do hereby declare the following to be a full, clear, and exact description of the invention, such as will enable others skilled in the art to which it appertains to make and use the same.

My invention relates to improvements in lock-nuts, in which I construct the nut in two parts in such a manner that the action of the combined parts when the nut is screwed home tends to so tighten the grip upon the threads of the bolt with which it is used as to prevent its working loose by reason of the vibration to which it may be subjected. I attain this object by the appliance or combination of appliances illustrated in the accompanying drawings, in which the same letters refer to similar parts throughout the several views.

Figure 1:
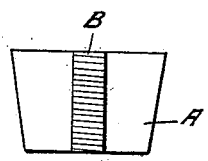
Figure 2:
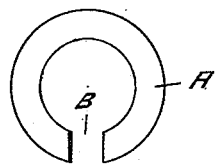

Figure 1 is a side elevation of a cone-shaped spring liner or bush A, hereinafter referred to as the "bush," which forms the first part of my improved lock-nut, which is screwed on its inside with threads to correspond to the threads on the bolt with which it has to be used. One side I form with a longitudinal or diagonal slit B, extending right through one side for its full depth. The outside of the bush I make smooth and of a suitable taper, the smaller end being placed toward the head of the bolt. By tapping the bush slightly smaller than the bolt with which it has to be used a sufficient amount of spring or elasticity will exist, owing to the presence of the slit to cause the bush to grip the bolt. Fig. 2 is a plan of the last-named bush.

Figure 3:
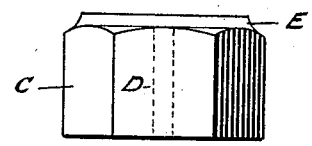
Figure 4:
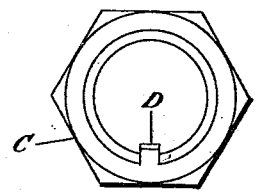

Fig. 3 is a side elevation of a shell or sleeve C, hereinafter referred to as the "sleeve," which forms the second part of my improved lock-nut. Externally it resembles an ordinary nut and may be either hexagon, square, or of other convenient shaped. Internally it is formed like a hollow cone to fit over the previously-described bush A and is provided with a longitudinal or diagonal key or feather D, extending the full depth of the same. This key or feather corresponds and fits loosely into the longitudinal or diagonal slit B in the bush. Fig. 4 is a plan of the last-named sleeve.

Figure 5:
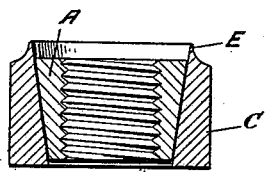
Figure 6:
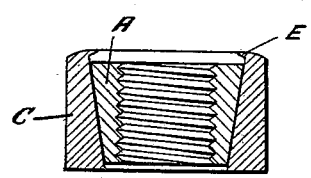

Fig. 5 is a section of my improved lock-nut, showing the bush inside the sleeve ready for use. In this view a projection E is shown running around the major opening of the orifice in the sleeve C. This projection E is used for securing the bush A inside the sleeve in such a way that it may be free to move longitudinally and turn axially. Fig. 6 is a similar section of my improved lock-nut, showing the projection E turned or closed down, so as to secure the bush within the sleeve, as already described. This projection can be turned or closed inward by a hydraulic or other suitable power press, or in some cases the projection may be closed by hammering.

Figure 7:
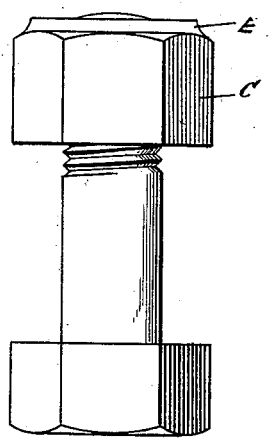
Figure 8:
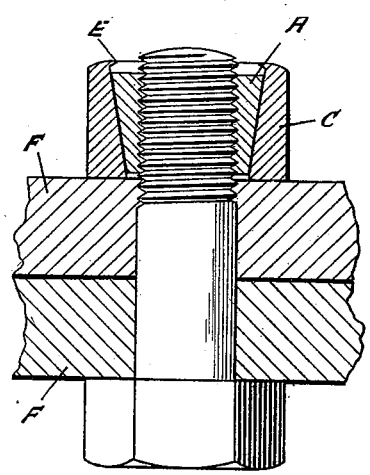

Fig. 7 is an elevation of one of my improved lock-nuts, comprising the bush and the sleeve screwed into position upon a bolt. Fig. 8 is a section of the same, which shows sufficient clearance between the small end of the conical bush and the face of the sleeve to allow of the bush being drawn down deeper into the sleeve, and thereby tightened onto the threads of the bolt and locked.

The action of my improved lock-nut is as follows: When the sleeve C is turned by a screw-key, spanner, or other suitable implement, the bush A, by means of the key or feather D, fitting into the slit B, is simultaneously turned with it. As soon as the face of the sleeve comes in contact with the object F, onto which it is being screwed down, its advance is arrested; but by continuing the turning process in the same direction the bush will advance farther along the thread of the bolt and deeper into the sleeve by which it is surrounded and actuated, when by reason of the formation of the two parts the bush as it advances within the sleeve is closed more tightly upon the threads of the bolt until the several parts are securely locked together. In like manner when the sleeve is turned by means of a spanner or other implement in an opposite direction the parts may be unlocked and unscrewed from the bolt.

What I claim as my invention, and desire to secure by Letters Patent, is—

1. A nut comprising an inner part circular and conical on the outer side and threaded on its interior, said inner part having a split in it to make the same elastic, and an outer part having a key D fitting the split in the inner part, said inner part being slightly smaller in internal diameter than the bolt and the split opening therein being slightly larger than the key to allow the spring action of the inner part to take place, substantially as described.

2. A nut comprising an inner split part circular and tapered on its outer side and threaded inside and an outer part having a key D fitting in the split of the inner part and having a projection E extending inwardly from its larger opening, substantially as described.

In witness whereof I have hereunto set my hand in presence of two witnesses.

PETER JOSEPH WILSON.

Witnesses:
　THOMAS L. WALKDEN,
　HARRY JINKINSON.